United States Patent [19]

Shinozaki

[11] Patent Number: 4,787,651
[45] Date of Patent: Nov. 29, 1988

[54] PASSIVE SAFETY BELT APPARATUS

[75] Inventor: Hidetaka Shinozaki, Utsunomiya, Japan

[73] Assignee: Honda Giken Kogyo Kabushiki Kaisha, Tokyo, Japan

[21] Appl. No.: 56,632

[22] Filed: Jun. 2, 1987

[30] Foreign Application Priority Data

Jun. 2, 1986 [JP] Japan .................. 61-82472[U]

[51] Int. Cl.4 ............................................. B60R 21/10
[52] U.S. Cl. .................................................. 280/803
[58] Field of Search ............... 280/801, 802, 803, 807

[56] References Cited

U.S. PATENT DOCUMENTS 4,264,089 4/1981 Maekawa et al. .................. 280/803
4,290,628 9/1981 Okuyama ............................ 280/803
4,372,579 2/1983 Matsuoka ............................ 280/802
4,621,835 11/1986 Edwards ............................. 280/803

Primary Examiner—John J. Love
Assistant Examiner—Ross Weaver
Attorney, Agent, or Firm—Armstrong, Nikaido, Marmelstein & Kobovcik

[57] ABSTRACT

A passive seat belt apparatus including a lap belt retractor mounted inside of the door of a vehicle, a lap belt extending between the retractor and an engaging member in the interior of the vehicle adjacent the center line thereof, a through ring attached to a lower portion of the door having an oval opening through which the lap belt extends downwardly around a lower surface thereof, and a bar-shaped guide member attached to the door above and inside of the through ring with respect to the interior of the vehicle. The lap belt passes over the guide member.

3 Claims, 3 Drawing Sheets

PASSIVE SAFETY BELT APPARATUS

BACKGROUND OF THE INVENTION

This invention relates to a passive safety belt apparatus in which, in conjunction with opening and closing of a door of a motorcar, the belt is automatically positioned with respect to a rider.

A conventional passive safety belt apparatus usually operates so that a lap belt to be applied to the waist of a rider is pulled out from a retractor provided in the door. The belt is directed downwards to pass through a through ring attached to a lower portion of the door. The belt is then brought into engagement with an engaging member provided on an inner side of a seat situated adjacent the center line of the vehicle body. In this case, a portion of the lap belt pulled out from the door is as shown in FIG. 6. Namely, the lap belt a taken out from the interior of the door b is passed from above through the through ring c and is turned in the direction to reach the engaging member.

Consequently, this conventional apparatus is inconvenient in that, if the door b is rapidly closed, the retracting speed of the retractor cannot follow the door speed. A portion of the lap belt a becomes slack and hangs downwardly. It is possible for the slack, hanging portion to get pinched between the door b and the vehicle body as the door is rapidly closed.

OBJECT AND SUMMARY OF THE INVENTION

This invention has for its object, to provide an apparatus whereby a lap belt can be prevented from becoming slack and hanging down. That is, it is an object of the invention to make it difficult for a lap belt to be caught in the door.

In one aspect thereof, the invention is a passive safety belt apparatus for a vehicle which includes a body having a center line, a door pivotably mounted on the body to one side of the center line, a seat in the body between the door and the center line, and an engaging member having emergency release means fixed to a portion of the seat located adjacent the center line.

The passive safety belt apparatus includes a lap belt retractor mounted inside the door. A lap belt extends between the retractor and the engaging member with the forward end of the belt having a hook engaging the engaging member. A through ring is attached to a lower portion of the door. The lap belt extends downwardly from the retractor inside the door through an oval opening of the ring and around a lower surface thereof. A bar-shaped guide member is attached to the door. An upper surface of a guide portion of the guide member is located at a position higher than the lower surface of the through ring and outwardly of a center of the door nearer to the center line of the vehicle body than the through ring. The lower surface of the lap belt contacts the upper surface of the guide portion.

In a second aspect thereof, the invention is a lap belt guide structure for use in a passive safety belt apparatus in a vehicle having a door, a lap belt retractor in the door, and a lap belt extending from the retractor to a point in an interior of the vehicle. The guide structure comprises several components.

A through ring is provided having a lower surface and an oval opening for passing the lap belt therethrough and around the lower surface. Means are provided for mounting the through ring in a lower portion of the door below the retractor. A bar-shaped guide member is provided having a guide portion with an upper surface. The guide member is attachable to the door such that the upper surface of the guide portion is located at a position higher than the lower surface of the through ring and outwardly of a center of the door nearer to a center line of the vehicle than the through ring. The lower surface of the lap belt contacts the upper surface of the guide portion.

Next, the operation of the foregoing apparatus will be explained as follows:

The lap belt is made of rather thick fabric and has a certain degree of elasticity so as to be supported in its flat condition from below by the lap belt guide member. In this manner, a slack hanging tendency of the portion of the belt that is in the vicinity of the through ring of the door can be prevented. This makes it more difficult for that part of the lap belt to get pinched between the door and a side sill of the vehicle body, when the door is closed rapidly.

BRIEF EXPLANATION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
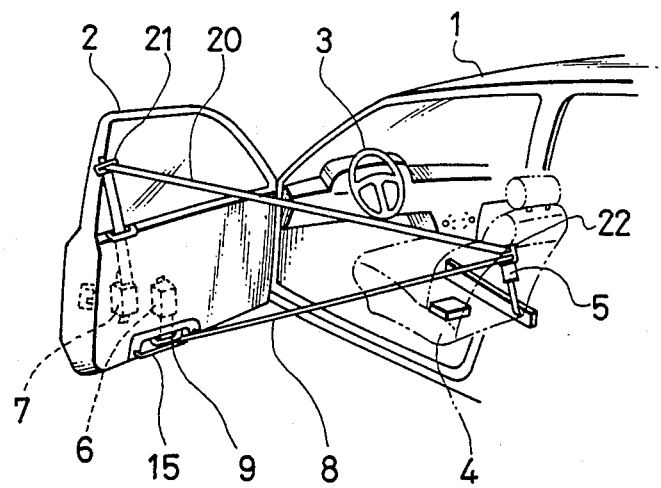
FIG. 1 is a perspective view of a door of a motorcar, in an opened position, which is provided with one example of a passive safety belt apparatus in accordance with the present invention.

One embodiment of this invention will be explained with reference to the accompanying drawings:

FIG. 1 shows a vehicle body 1 of a motorcar having a door 2, a steering wheel 3, and a seat 4. An engaging member 5 provided with an emergency release means is fixed to an inner side portion of the seat 4 located adjacent the center line of the vehicle body 1.

The interior of the door 2 is provided with a lap belt retractor 6 and a shoulder belt retractor 7 for a passive safety belt apparatus. A lap belt 8 to be applied to the waist part of a rider is arranged to be pulled out from the lap belt retractor 6 and be directed from above downwards to pass through a through ring 9 for being taken out from a recessed portion 11 of a door lining 10.

Figure 3:
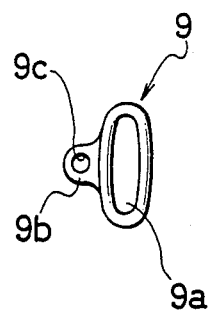
FIG. 3 is a top plan view of a through ring.

As shown clearly in FIG. 3, the through ring 9 is in the form of an oval and is provided with an oval opening 9a through which the lap belt passes, a tab portion 9b protruded from a long side edge of the oval, and a circular opening 9c in the tab portion 9b for pivotally attaching the through ring 9 to other structure. As shown clearly in FIG. 5, the ring 9 is pivotally attached turnably to a lower portion of the door 2 by a pin 12 passing through the circular opening 9c thereof and an opening in a door panel reinforcing member 2a applied to the door 2.

Figure 4A:
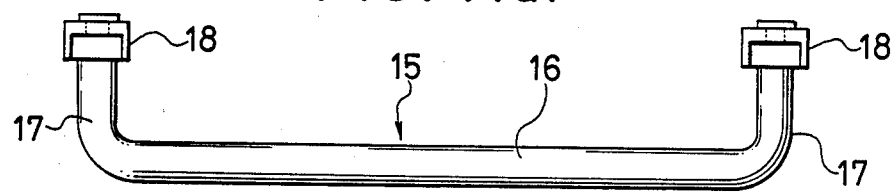
FIG. 4a is a top plan view of a lap belt guide member.
Figure 4B:
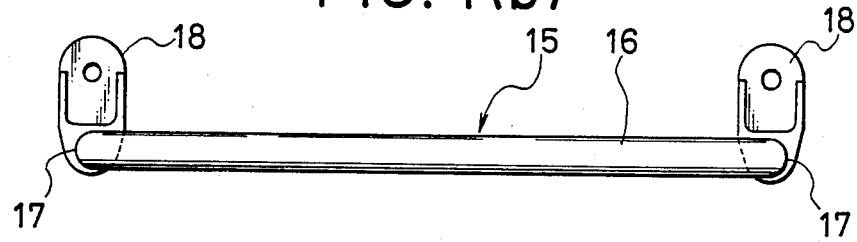
FIG. 4b is a front view thereof.

The lap belt guide member 15 is formed as shown in FIGS. 4a and 4b, of a round bar bent into a channel shape to form a guide portion 16 and arm portions 17, 17 extending from both ends of the guide portion 16. A metallic fixing member 18 is fixed to an end portion of each arm portion 17.

Figure 5:
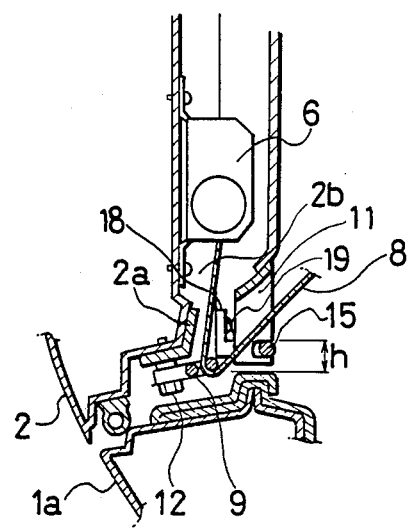
FIG. 5 is a sectional view taken along the line V—V in FIG. 2.
Figure 6:
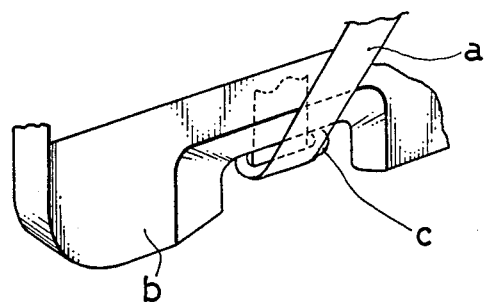
FIG. 6 is a perspective view of a conventional apparatus.

The fixing member 18 on each end thereof is fixed to a door panel portion 2b by a screw 19, as shown in FIG. 5. The guide portion 16 is located at a position such that an upper surface of the guide portion 16 is situated at a higher level, by the amount h, than a level of a lower surface of the through ring 9. Further, the position of the guide portion 16 is located nearer to the center line of the vehicle body 1 than the through ring 9 is. The lap belt 8 pulled out from the lap belt retractor 6 is passed from above through the oval opening 9a of the through ring 9, and is bent obliquely upwards to pass by through a space between the lower surface of the through ring 9 and the upper surface of the lap belt guide portion 16 of the lap belt guide member 15.

A shoulder belt 20 pulled out from the shoulder belt retractor 7 is connected, together with the lap belt 8, to a hook 22. The hook 22 is detachably engaged with the engaging member 5 provided with the emergency release means. The shoulder belt 20 passes through a through ring 21 pivotally attached to an upper portion of the door 2. The two belts 8, 20 are rather thick fabric ones and have a certain degree of self-shape-holding.

Figure 2:
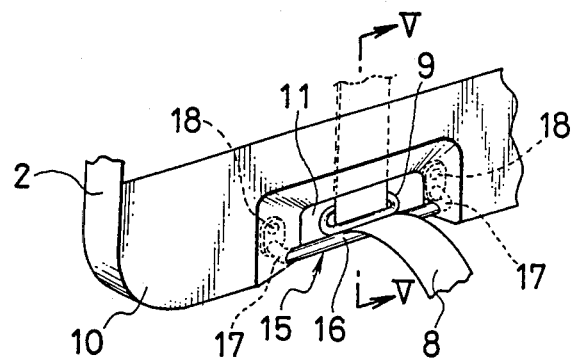
FIG. 2 is an enlarged perspective view of an important portion thereof.

With the foregoing arrangement of this invention, if, under a opened door condition as shown in FIG. 1, a rider such as a driver sits down on the seat 4 and the door 2 is then closed, the belt retractors 6, 7 act to wind up the lap belt 8 and the shoulder belt 20. The belts 8, 20 are automatically positioned and applied to the waist and the shoulder of the rider. If, in this case, the door closing speed is higher than the retracting speed of each of the retractors 6, 7, the belts 8, 20 become slack. Especially, the slack on the lap belt 8 would hang down and tend to get pinched between the door 2 and a side sill 1a of the vehicle body. However, the lower surface of the slack part of the lap belt 8 is received on the upper surface of the guide portion 16 of the lap belt guide member 15. Because the lap belt 8 itself has a certain extent of self-shape-holding, the belt 8 does not droop immediately after passing by the upper surface of the lap belt guide member 15, and can be supported while being kept in an obliquely upward flat condition as shown in FIGS. 2 and 5. Accordingly, the slack part of the lap belt 8 can be retracted by the retractor 6, without hanging downwards to a position which is lower than the lower end of the door 2.

Thus, according to this invention, the lap belt can be prevented from getting pinched by the door so that, when closing the door, it is not necessary to close the same slowly while taking into consideration of slackening of the lap belt. In this manner, the handling of the lap belt can be facilitated. The apparatus is simple in construction, so that the same can be manufactured at a low cost.

It is readily apparent that the above-described passive safety belt apparatus meets all of the objects mentioned above and also has the advantage of wide commercial utility. It should be understood that the specific form of the invention hereinabove described is intended to be representative only, as certain modifications within the scope of these teachings will be apparent to those skilled in the are.

Accordingly, reference should be made to the following claims in determining the full scope of the invention.

What is claimed is:

1. A passive safety belt apparatus for a vehicle, the vehicle including a body having a center line, a door pivotally mounted on the body to one side of the center line, a seat in said body between the door and the center line, and an engaging member having emergency release means fixed to a portion of the seat located adjacent the center line of the body; said apparatus comprising:
    a lap belt retractor mounted inside of the door,
    a lap belt extending between said retractor and the engaging member, said lap belt being taken out of said retractor through a recessed opening provided at the lower most portion of the door, said lap belt having a lower surface, a forward end, and means on said forward end for engaging the engaging member,
    a through ring attached to a lower portion of the door and having an opening and a lower surface, said lap belt extending downwardly from said retractor inside the door through said opening of said through ring and around said lower surface of said through ring, and
    a bar-shaped guide member attached to the door at said lowermost portion such that no interference occurs between said guide member and said lap belt which the door is in a closed position, said guide member having a guide portion with an upper surface, said upper surface of said guide portion being located at a position higher than said lower surface of said through ring and nearer to the center line of the vehicle body than said through ring, said lower surface of said lap belt contacting said upper surface of said guide portion.

2. A passive safety belt apparatus as claimed in claim 1, wherein the lap belt guide member is a round bar which is bent into a channel-shape forming said guide portion and arm portions on both ends thereof, and a metallic fixing member is fixed to an end portion of each arm portion.

3. A lap belt guide structure for use in a passive safety belt apparatus in a vehicle having a door, a lap belt retractor in the door, and a lap belt extending from the retractor to a point in an interior of the vehicle, said lap belt being taken out of said retractor through a recessed opening in a lowermost portion of the door, said guide structure comprising:
    a through ring having a lower surface and an opening for passing the lap belt therethrough and around said lower surface,
    means for mounting said through ring to a lower portion of the door below the retractor, and
    a bar-shaped guide member having a guide portion with an upper surface and being attachable to the door at the lowermost portion of the door such that no interference occurs between said guide member and the lap belt when the door is in a closed position and such that said upper surface of said guide portion is located at a position higher than said lower surface of said through ring and nearer to a center line of the vehicle than said through ring enabling a lower surface of the lap belt to contact said upper surface of said guide portion.

* * * * *